(12) United States Patent
Rypstra

(10) Patent No.: US 7,490,623 B2
(45) Date of Patent: Feb. 17, 2009

(54) PRESSURE-RELIEF ONE-WAY VALVE APPLICABLE TO A PACKAGE CONTAINING A GAS-RELEASING PRODUCT, WHEREIN THERE COEXIST A FLUID MEDIUM AND AN AIR BUBBLE, AND A PACKAGE INCLUDING SAID VALVE

(75) Inventor: Christian Rypstra, Buenos Aires (AR)

(73) Assignee: Celomat S.A., Buenos Aires (AR)

( * ) Notice: Subject to any disclaimer, the term of this patent is extended or adjusted under 35 U.S.C. 154(b) by 709 days.

(21) Appl. No.: 11/245,363

(22) Filed: Oct. 6, 2005

(65) Prior Publication Data

US 2006/0076058 A1   Apr. 13, 2006

(30) Foreign Application Priority Data

Oct. 7, 2004   (AG)   .............. P040103631

(51) Int. Cl.
*F16K 15/14*   (2006.01)
*B65D 77/22*   (2006.01)

(52) U.S. Cl. .................. 137/246; 137/859; 383/100
(58) Field of Classification Search .......... 137/246, 137/859; 383/100, 103; 426/118
See application file for complete search history.

(56) References Cited

U.S. PATENT DOCUMENTS

| | | | |
|---|---|---|---|
| 2,640,481 A * | 6/1953 | Conley | ........................ 137/859 |
| 2,821,338 A | 1/1958 | Metzger | |
| 2,870,954 A | 1/1959 | Kulesza et al. | |
| 2,927,722 A | 3/1960 | Metzger | |
| 2,946,502 A | 7/1960 | Metzger | |
| 3,717,276 A | 2/1973 | Luczak et al. | |
| 3,799,427 A * | 3/1974 | Goglio | ........................ 383/103 |
| 4,000,846 A * | 1/1977 | Gilbert | ........................ 383/103 |

(Continued)

FOREIGN PATENT DOCUMENTS

DE   23 31 862   1/1975

(Continued)

*Primary Examiner*—John Rivell
(74) *Attorney, Agent, or Firm*—Volpe and Koenig, PC

(57) ABSTRACT

A one-way pressure-relief valve (4) applicable to a package (1) which contains a gas releasing product, said package (1) comprising walls defining a package structure for said product, one of such walls (2) bearing at least one orifice (3) for gases to be expelled, on which orifice the one-way valve (4) is applied, valve (4) comprising a thin flexible bottom sheet (5) provided with an opening (7) and a thin flexible top sheet (6) overlapping bottom sheet (5), wherein bottom sheet (5) is attached to the top sheet (6) in a region defined by the edge of valve (4) and a closed perimeter (7'), the closed perimeter (7') being defined on a substantially central region of valve (4), surrounding opening (7); a portion of closed perimeter (7') being located substantially near a portion of the perimeter of opening (7), defining a first sector (8) within which a gas medium is enclosed, and the remaining portion of closed perimeter (7') is located substantially apart from the remaining portion of opening (5) perimeter, defining a second sector (9) within which a fluid medium is enclosed; and wherein top sheet (6) bears at least one micro-perforation (10) in a region of the surface thereof which is located above second sector (9). Also disclosed is package (1) which contains the one-way valve (4).

17 Claims, 1 Drawing Sheet

U.S. PATENT DOCUMENTS

| | | |
|---|---|---|
| 4,051,973 A | 10/1977 | Botkin |
| 4,122,993 A | 10/1978 | Glas |
| 4,134,535 A | 1/1979 | Barthels et al. |
| 4,444,219 A * | 4/1984 | Hollenstein ............. 137/246 |
| 4,890,637 A * | 1/1990 | Lamparter ............... 137/246 |
| 5,263,777 A | 11/1993 | Domke |
| 5,354,133 A * | 10/1994 | Rapparini ................ 383/103 |
| 5,584,409 A | 12/1996 | Chemberlen |
| 5,782,266 A | 7/1998 | Domke |
| 5,992,442 A * | 11/1999 | Urquhart et al. ......... 137/246 |
| 6,182,850 B1 * | 2/2001 | Marbler et al. ........... 383/103 |
| 6,662,827 B1 * | 12/2003 | Clougherty et al. ...... 137/859 |
| 6,663,284 B2 * | 12/2003 | Buckingham et al. ..... 383/103 |
| 2006/0225787 A1 * | 10/2006 | Newrones et al. ......... 137/246 |

FOREIGN PATENT DOCUMENTS

| | | |
|---|---|---|
| DE | 27 16 299 | 10/1978 |
| DE | 30 31 208 | 4/1982 |
| DE | 35 26 586 | 2/1987 |
| DE | 36 18 829 | 12/1987 |
| DE | 44 35 492 | 4/1996 |
| EP | 0023703 | 2/1981 |
| EP | 0024310 | 3/1981 |
| GB | 1169280 | 11/1969 |

* cited by examiner

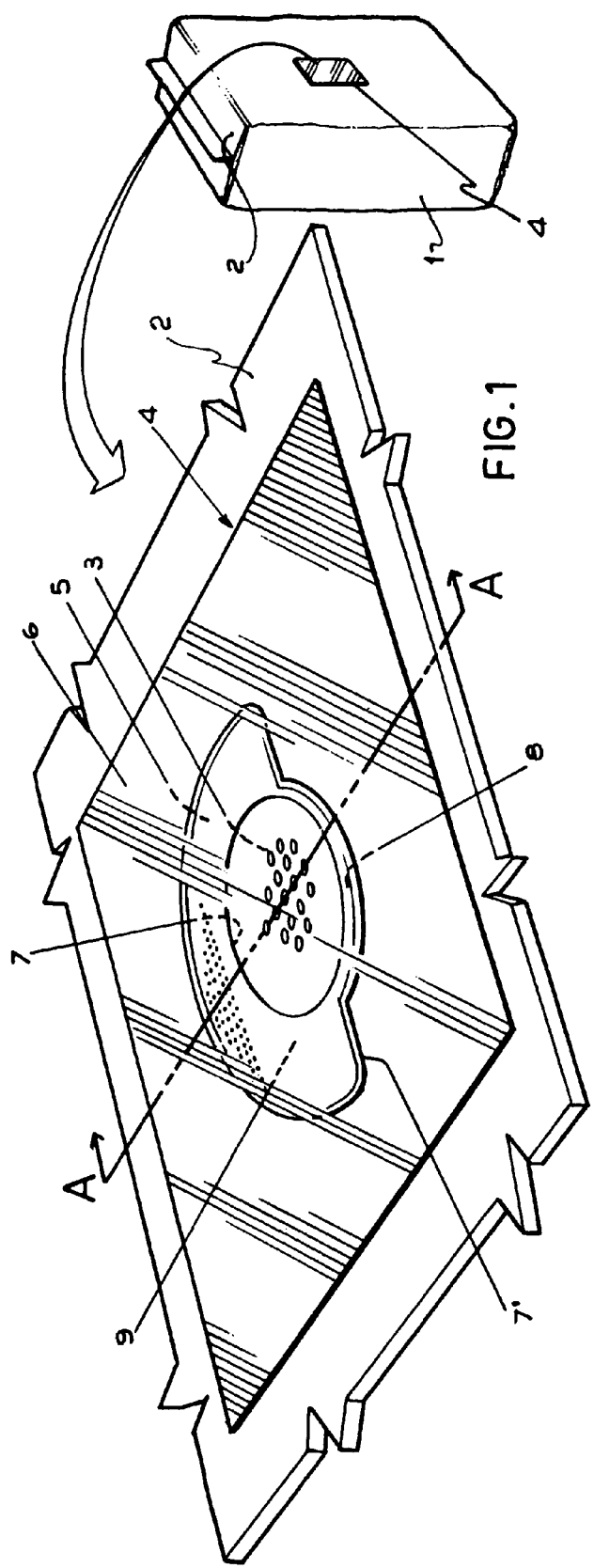
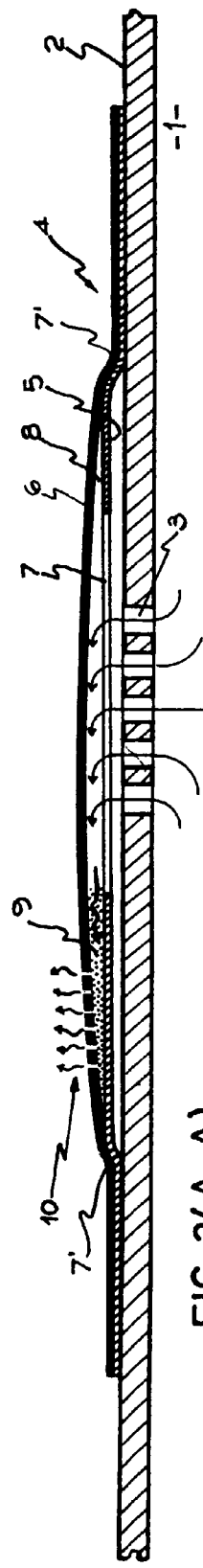
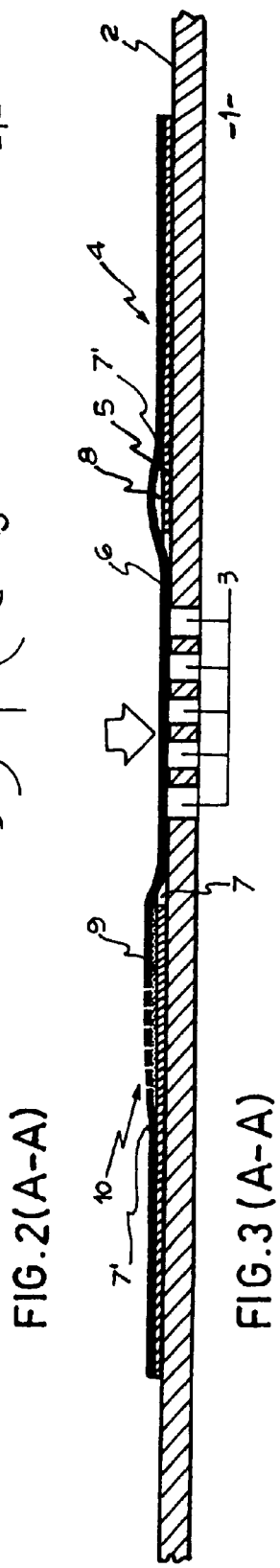

US 7,490,623 B2

PRESSURE-RELIEF ONE-WAY VALVE APPLICABLE TO A PACKAGE CONTAINING A GAS-RELEASING PRODUCT, WHEREIN THERE COEXIST A FLUID MEDIUM AND AN AIR BUBBLE, AND A PACKAGE INCLUDING SAID VALVE

FIELD OF INVENTION

The present invention refers to a pressure-relief one-way valve which is applicable to a package containing a gas-releasing product, in which there coexist a fluid medium and an air bubble, and to a package including such valve. More specifically, the invention refers to a one-way valve which may be applied to packages, preferably flexible packages made of flexible plastic laminar material, such as those typically used for the packaging of coffee, sugar, bread, animal food, milk powder, etc.

BACKGROUND

When a product is packaged at sea level and is subsequently transported to the mountain, the external pressure decreases. Due to that reason packages may even burst as a consequence of the internal-external pressure difference. Such was the case of the "Pringles" potato chips, which sale was discontinued in those countries with great altitude differences, as packages lids were expelled during their transport, exposing the contents thereof. There are also packaged products, such as coffee, which release gases generating an over-pressure capable of bursting the package.

One-way valves are thence a valid alternative by which this kind of problems may be solved.

Packages including a one-way valve may be made of a rigid material or a flexible laminar material, said material being totally impervious all over its surface, said surface exhibiting a plurality of small orifices on a small portion thereof. The purpose of said orifices is to allow gas produced within the package to migrate towards the environment as a result of the generated over-pressure or simply in order to equalize internal-external pressures when said package is transported.

In order to prevent entering of environmental oxygen into the package, said orifices are covered by a one-way valve, which is in closed position when the package internal pressure is equal or lower than the environmental pressure, and in open position when the internal pressure is higher than the environmental one (over-pressure).

A particular application of this kind of valves involves roasted coffee. Roasted coffee, once packaged, retains its aroma for about 8-10 weeks. After such time, there begins an ageing period as a result of catalyzed oxygen condensation and polymerization reactions, which culminate with the formation of small quantities of peroxides which adversely affect coffee's aroma and flavor.

Many intents have been made with the object of developing coffee packages bearing a minimum quantity of oxygen, such as vacuum packages. Nevertheless, this type of packages undergoes a slow production of gases, such as carbon dioxide, which inflate same and thence there exists the risk of packages bursting upon their stacking. Such gases production within the packages is due to the fact that during the roasting process, along with coffee's characteristic brown colour and aroma development, a large quantity of carbon dioxide slowly releases from coffee grains during the first three weeks, thus producing package swelling.

In order to solve this problem one-way valves have been developed, application thereof not being limited to coffee packages but may be also useful for any package bearing products capable of generating gases or which are to be transported through areas of wide pressure differences. The important fact regarding these valves is that they should open upon the most minimum over-pressure, allowing gases to be expelled from the package towards the external environment and at the same time they should be able to close as fast as possible in order to prevent external oxygen from entering the package and thus give rise to an undesirable oxidation.

One-way valves are widely known, and their structure may be divided in two classes: flexible or rigid. Some documents which disclose the later are U.S. Pat. Nos. 2,870,954, 3,717, 276, 4,051,973, 4,122,993, 4,000,846, 5,584,409, DE 4435492 A1, DE 2716299, DE 3031208 A1 and EP 24310 A1. The problem with rigid valves, however, is that they are not very adaptable to flexible packages. As they are not able to meet mechanical solicitations to which packages are subject during their transport and storage, there exists a significant risk of detachment of said valves. This could cause spilling and/or contamination of the packaged product.

On the other hand, packaging speed is lower when using rigid valves, as they must be applied to the package on the packaging line, application times being longer than those required in the case of flexible valves. The advantage of flexible valves is that they may be applied to packages before the packaging process takes place.

As regards flexible valves, there can be mentioned the following prior art documents.

Patent U.S. Pat. No. 2,821,338 (Metzger) discloses a one-way valve consisting of a pair of elongated and overlapping sheets: a top one contacting the external environment and a bottom one contacting the package film and bearing an opening, preferably a circular one, which coincides with and exhibits a larger diameter than said package opening. Both sheets are comparatively thin, they are made of the same flexible, impervious material, and they are joined by two of their sides by means of a thermoseal. A small strip, also made of flexible and impervious material, is arranged between said top and bottom sheets, more specifically over the opening of the bottom sheet. This small strip acts as an auxiliary "flap" type valve and also as isolation for said opening. As this small strip material is not thermo-sealable it prevents the valve top sheet portion, which overlaps the circular opening, from sealing against the bottom sheet during the valve sealing, which fact would hinder the operation thereof.

U.S. Pat. No. 2,927,722 (Metzger) discloses a one-way valve which is similar to the above, characterized in that, in order to assist in the valve aperture should there exist a high cohesion between overlapping sheets, a small area of the adhesive coating which joins the top and bottom sheets one to the other and to the auxiliary "flap" type valve, it is rendered non-adhesive by means of the inclusion of a substance such as talc, glycerine or any other class of similar inert non-adhesive substance. Said small area is preferably located near one of the edges of the valve.

According to U.S. Pat. No. 2,946,502 (Metzger) said inert non-adhesive substance extends over the full surface of the valve central portion including the opening, thus generating an adhesive-free path for gases to be expelled.

Document GB 1169280 discloses a plastic bag provided with a perforated surface on one of its walls, a flexible plastic perforated sheet fixed to said wall and covering said perforated surface, and an air-permeable material barrier sandwiched between said perforated surface and said sheet. Such permeable material consists of an elastic sponge with interconnected rubber cells or a synthetic plastic material; such perforated sheet being fixed to said bag wall by means of a thermoseal.

Patent EP 23703 B1 discloses a valve which works even under stacked bags. To such effect and on the opposite side of the valve where the adhesive coating is applied in order to attach same to the package, there are applied spacing strips which are thicker than the valve, preferably 200 micrometers thick, whereas thickness of sheets which conform the valve itself is not greater than 35 micrometers.

Patent DE 2331862 discloses a valve which allows gases from the interior of a package to be released through a series of orifices made on the top sheet thereof, which orifices do not coincide with the package opening.

Documents DE 3526586 A1 and DE 3618829 disclose over-pressure valves conformed by a single flexible membrane which is fixed by means of an adhesive to a package wall, preferably to a base thereof. Said membrane blocks a passage orifice made on said package and defines an outlet channel for gases. In order to prevent environmental air diffusion through said channel, a liquid blocking means, such as silicone oil, is introduced therein. Thus, said channel acts as a filter, more particularly a wet filter.

U.S. Pat. No. 4,134,535 describes a valve with one or two sheets which uses a porous element bearing a highly cohesive non-volatile liquid or respectively high surface tension which is enclosed between the package wall and one of the sheets or between said two sheets. The top sheet exhibits orifices through which gas from the interior of the package is released due to the capillarity effect. Upon a certain over-pressure from the interior of the package cohesiveness or high surface tension of the liquid within the porous element is broken, thus allowing gas passage through it towards the outlet orifices. Forces originated from the over-pressure are higher than cohesion forces between liquid particles. After pressures are equalized, capillarities formed in the liquid are closed again by surface forces.

U.S. Pat. No. 5,263,777 discloses a one-sheet valve adhesively attached by two of the laterals thereof to one of the walls of the package onto which it is applied, covering the different orifices existing on the later for the interior-originated gases to be expelled. The adhesively attached region adopts the form of wedged adhesive strips in order to allow the correct functioning of the valve when packages are stacked. Such wedge operates in a manner similar to spacing strips of above referenced patent EP 23703 B1.

U.S. Pat. No. 5,782,266 includes an alarm device incorporated into a pressure-relief valve in order to protect the package contents. Said device adopts the form of a strip which is adhesively attached to the valve through one of its sides.

All of the above flexible valves have drawbacks. For instance, when using a high cohesion and/or surface tension fluid medium, such as oil, in order to block the passage of environmental oxygen into the package, surface tension of said fluid medium placed between the two overlapping sheets may be so high that cohesion could prevent over-pressure of the package from detaching the top sheet from the bottom one, thus rendering the valve inoperable, even leading to packages bursting. On the other hand, when a granular medium is used in order to assist in the valve aperture, as for example talc, particles could cover the gases outlet opening, or even the valve could remain permanently opened.

Consequently, valves bearing a fluid, granular or gas medium in inter-laminar spaces have drawbacks which hinder the operation thereof.

SUMMARY

Applicant has found that the simultaneous presence of fluid and gas media in a single valve solves such problems.

Accordingly, it is the object of the present invention to combine the advantages provided by fluid and gas media separately. This is achieved through the simultaneous existence, or co-existence, in a valve conformed by two thin, flexible and overlapped sheets, of a first sector bearing a fluid and a second sector bearing gas, as for instance oil and air.

A non-volatile fluid exhibiting high cohesion and/or high surface tension such as oil, efficiently prevents environmental oxygen from entering into the package.

A gas medium, e.g. air, partially surrounding the gas outlet opening, facilitates aperture of the valve.

In this manner, gas medium acts as an "air bubble", similar to the "water bubble" of mason's levels, allowing package internal gases to find, in a relatively easy way, an initial path which will allow the top sheet detachment from the bottom sheet.

A valve is thus obtained wherein gas expelling from the package interior is accomplished without the risk of occlusion due to the presence of a gas medium, and wherein the environmental polluting oxygen entering into the package is strongly reduced due to the presence of a fluid medium.

It is thence the object of the present invention a one-way pressure-relief valve which is applicable to a package containing a gas-releasing product, said package comprising walls defining a structure which contains said product, one of the walls thereof bearing at least one orifice for the gases to be expelled, on which orifice the one-way valve is applied, said valve comprising a thin flexible bottom sheet which bears an opening, and a thin flexible top sheet overlapping the bottom sheet, wherein said bottom sheet is attached to said top sheet at a region limited by the edge of said valve and a closed perimeter, said closed perimeter being defined on a substantially central region of said valve, surrounding said opening, a portion of said closed perimeter being located substantially near a portion of said opening perimeter, defining a first sector within which a gas medium is enclosed, and the remaining portion of the closed perimeter being located substantially apart from the remaining portion of the opening perimeter, defining a second sector within which a fluid medium is enclosed; and wherein the top sheet exhibits at least one micro-perforation at a region of the surface thereof located above the second sector.

Still another object of the invention is a package including the one-way valve of the invention.

BRIEF DESCRIPTION OF THE DRAWING(S)

The invention will be better understood when referring to the following figures.

FIG. 1 shows a perspective view of the valve according to the invention.

FIG. 2 shows the inventive valve in an open condition.

FIG. 3 shows the inventive valve in a closed condition.

DETAILED DESCRIPTION OF THE PREFERRED EMBODIMENT(S)

FIG. 1 illustrates a package 1, bearing on one of its walls 2 at least one orifice 3 for the expelling of gases originated from the interior thereof. Said at least one orifice 3 is covered by a one-way valve 4 which is attached to wall 2 of said package 1 in a matching and preferably adhesively way. It is within the capability of one of ordinary skill in the art to employ another means for attaching said valve 4 to wall 2 of package 1, as for instance heat, welding, ultrasound or the like.

Said one-way valve 4 is conformed by two thin overlapping sheets, a bottom sheet 5 and an top sheet 6, both of similar thickness and equal surface, substantially uniform, not greater than 100 microns and preferably from 10 to 50microns. Bottom sheet 5 bears an opening 7 in a region of its surface, preferably a curved one, and more preferably circular or elliptical, in order to allow passage of internal gases of package 1 towards the external environment. Said bottom sheet 5 is attached to said top sheet 6, preferably by means of an adhesive, through a matching lamination at a certain portion of the surface of both sheets. Said certain portion of both bottom sheet 5 and top sheet 6 is defined by the edge of valve 4 and a closed perimeter 7', the later being essentially curve and placed substantially apart from the edge of valve 4. Matching lamination allows the definition of this certain portion of the surface without the adhesive attaching both sheets spreading through the edge of valve 4 or through said closed perimeter 7'. Obviously it is within the capabilities of one of ordinary skill in the art to perform a matching lamination employing an attachment means other than an adhesive. In turn, said closed perimeter 7' surrounds said opening 7. A portion of said closed perimeter 7' is located substantially near a portion of said opening 7 perimeter, showing the same peripheral geometrical configuration of the later, i.e. preferably circular or elliptical, and defines a first sector 8 within which a gas medium is enclosed. The remaining portion of said closed perimeter 7' is located substantially spaced from the perimeter of said opening 5. Said remaining portion of said closed perimeter 7' peripheral geometrical configuration differs from that of the remaining perimeter of said opening 7. Said remaining portion of closed perimeter 7' defines a second sector 9 of greater surface as compared to said first sector 8, within which a fluid medium is enclosed. The remaining portion of closed perimeter 7' of said bottom sheet 5 may be curved, straight or a combination of both.

The function of said first sector 8, as previously discussed, is to facilitate opening of valve 4. Gas medium enclosed within said sector 8 is preferably an air bubble, and the fluid medium enclosed within said second sector 9 is highly cohesive, or respectively has a high surface tension and low volatility, as for example oil.

As illustrated by FIG. 2, upon a certain over-pressure from the interior of package 1, cohesiveness or high surface tension of the fluid enclosed in said second sector 9 is broken, thus giving rise to capillaries which allow passage of gas from package 1 towards the external environment. Valve will be in an open position.

Consequently, said bottom sheet (5) clearly possesses two regions:

i) a first region defined by the surface enclosed by said closed perimeter 7'; and ii) a second region wherein said bottom sheet 5 is attached to said top sheet 6.

Said valve 4 is attached to said wall 2 of said package 1, preferably by means of an adhesive, but it may also be attached by means of welding, thermo-sealing, ultrasound, or the like.

Due to the low quantity of fluid used in order to fill said second sector 9, it is very unlikely, due to the surface tension, for said fluid to go beyond said opening 7 perimeter and deposit on said at least one orifice 3 of wall 2 of package 1. However, should this happen, it would not affect operation of valve 4 in any manner whatsoever.

Unlike valves including paths for gases expelling, top sheet 6 of inventive valve 4 comprises at least one micro-perforation 10 for the gases to be expelled into the external environment once they have passed through the fluid medium. Said at least one micro-perforation 10 must be done at some point of said first region covered by said top sheet 6, and more specifically, at some point located above said second sector 9. It is to be understood that, clearly, said at least one micro-perforation 10 should not be located above said opening 7. In this way, gases will find their way out through capillaries formed in the fluid medium, which will perform as a wet filter.

Mean diameter of said at least one micro-perforation 10 should be such that the fluid material within said second sector 9 may migrate to the external environment. Over-pressure at which valve 4 opens depends on the surface tension of the fluid medium and the mean diameter of micro-perforation 10 of top sheet 6, according to the equation $p=2\gamma/R$, wherein $\gamma$ is the surface tension and R the mean diameter of the micro-perforation 10 of said top sheet 6. Opening over-pressure for valve 4 varies according to the fluid material used and the size of said at least one micro-perforation 10.

Once gases are expelled to the external environment, environmental pressure causes capillaries formed in the fluid material closure and valve 4 returns to its closed position, as shown by FIG. 3.

Section and length of said first sector 8 will substantially depend on the cohesion and/or surface tension properties of the fluid medium located within said second sector 9 and the properties of the gas medium. In other words, dimensions of said first sector 8 should be such as to prevent entering of the fluid medium into said first sector 8, displacing the "air bubble" from its enclosure. Determination of these dimensions is within the capabilities of one of ordinary skill in the art.

As previously mentioned, the fluid material used should be a liquid exhibiting high cohesion force or surface tension, it should not be affected by oxygen, it should exhibit low solubility with oxygen gas, it should be chemically stable and odorless, as for instance silicone oil, olive oil, peanut oil, mineral oils and some plasticizers such as e.g. dioctyl, dinonyl or dicecyl phthalates, or tallow acid esters.

Valve 4 may be applied to any kind of packages, preferably to those of flexible walls, but nothing prevents its use for rigid walls packages, as mentioned at the beginning hereof.

What is claimed is:

1. A one-way pressure-relief valve (4) applicable to a package (1) which contains a gas releasing product, said package (1) comprising walls defining a package structure for said product, one of such walls (2) bearing at least one orifice (3) for said gases to be expelled, on which orifice the one-way valve (4) is applied, said valve (4) comprising a thin flexible bottom sheet (5) provided with an opening (7) and a thin flexible top sheet (6) overlapping said bottom sheet (5), said valve (4) characterized in that said bottom sheet (5) is attached to said top sheet (6) in a region delimited by the edge of said valve (4) and a closed perimeter (7'), said closed perimeter (7') being defined on a substantially central region of said valve (4) surrounding said opening (7); a portion of said closed perimeter (7') being located substantially near a portion of the perimeter of said opening (7), defining a first sector (8) within which a gas medium is enclosed, and the remaining portion of said closed perimeter (7') being located substantially apart from the remaining portion of said opening perimeter (5), defining a second sector (9) within which a fluid medium is enclosed; and in that said top sheet (6) bears at least one micro-perforation (10) in a region of the surface thereof which is located above said second sector (9).

2. The valve according to claim 1, characterized in that the perimeter of said opening (7) is curved, preferably circular or elliptical.

3. The valve according to claim 1, characterized in that said closed perimeter (7') portion of said bottom sheet (5) and said portion of the perimeter of said opening which are substantially near exhibit the same perimetral geometrical configuration.

4. The valve according to claim 1, characterized in that said remaining portion of the closed perimeter (7') does not exhibit the same perimetral geometrical configuration as the remaining portion of the perimeter of said opening (7).

5. The valve according to claim 4, characterized in that said remaining portion of closed perimeter (7') exhibits a perimeter that is curved, straight or a combination of both.

6. The valve according to claim 1, characterized in that the surface of said second sector (9) is substantially larger than that of said first sector (8).

7. The valve according to claim 6, characterized in that section and length of said first sector (8) will substantially depend on the cohesion and/or surface tension properties of the fluid medium enclosed in said second sector (9) and on the properties of the gas medium enclosed in said first sector (8).

8. The valve according to claim 1, characterized in that the mean diameter of said at least one micro-perforation (10) should be such as to prevent said fluid material enclosed in said second sector (9) from migrating towards the external environment.

9. The valve according to claim 1, characterized in that said bottom sheet (5) size is equal to the size of said top sheet (6).

10. The valve according to claim 1, characterized in that attachment of said bottom sheet (5) to said top sheet (6) is preferably by means of an adhesive and through a matching lamination.

11. The valve according to claim 1, characterized in that said bottom sheet (5) possesses two regions, a first region being defined by the surface enclosed by said closed perimeter (7'); and a second region wherein said bottom sheet (5) is attached to said top sheet (6).

12. The valve according to claim 1, characterized in that said valve (4) is attached to said package (1) by means of an adhesive, thermo-seal, ultrasound or welding, and in a matching manner so that said opening (7) will be located above said at least one orifice (3).

13. The valve according to claim 1, characterized in that said top sheet (6) and said bottom sheet (5) thickness is substantially uniform, not exceeding 100 microns, preferably said thickness is from 10 and 50 microns.

14. The valve according to claim 1, characterized in that said gas medium is air, more specifically an air bubble.

15. The valve according to claim 1, characterized in that said fluid medium is a liquid exhibiting high cohesion or respectively high surface tension, said fluid is not affected by oxygen, it is scarcely soluble in oxygen, and further, it is chemically stable and odorless, as for instance silicone oil, olive oil, peanut oil, mineral oils and a plasticizers such as e.g. dioctyl, dinonyl or dicecyl phthalates, or tallow acid ester.

16. A package conformed by walls defining a structure containing products, one of said walls (2) bearing at least one perforation (3) which allows gases produced in the interior of said package (1) to be expelled, said package (1) being characterized in that said at least one perforation (3) is covered by a one-way valve (4) according to any of the precedent claims.

17. The package according to claim 16, characterized in that it comprises rigid or flexible walls.

\* \* \* \* \*